(12) United States Patent
Katayama

(10) Patent No.: US 7,066,100 B2
(45) Date of Patent: Jun. 27, 2006

(54) ADAPTER TABLE APPARATUS HAVING SENSOR FUNCTION

(75) Inventor: Noriaki Katayama, Kyoto (JP)

(73) Assignee: Katayama Denki Ltd., Kyoto (JP)

(*) Notice: Subject to any disclaimer, the term of this patent is extended or adjusted under 35 U.S.C. 154(b) by 348 days.

(21) Appl. No.: 10/370,302

(22) Filed: Feb. 18, 2003

(65) Prior Publication Data

US 2003/0167977 A1 Sep. 11, 2003

(30) Foreign Application Priority Data

Feb. 22, 2002 (JP) ........................................ 2002-047000

(51) Int. Cl.
*A47B 13/00* (2006.01)

(52) U.S. Cl. .......................................... 108/161; 269/55
(58) Field of Classification Search .................... 108/20, 108/21, 22; 269/161, 90, 37, 43, 45, 264, 269/55

See application file for complete search history.

(56) References Cited

U.S. PATENT DOCUMENTS 4,545,569 A * 10/1985 Schroder et al. .............. 269/43
6,588,995 B1 * 7/2003 Wills et al. .................. 269/106
6,701,596 B1 * 3/2004 Kloepfer et al. .............. 269/43

FOREIGN PATENT DOCUMENTS

| JP | 318278 | 12/1993 |
| JP | 254736 | 9/1994 |
| JP | 314272 | 12/1995 |
| JP | 320302 | 11/1999 |
| JP | 107970 | 4/2000 |
| JP | 105278 | 4/2001 |
| JP | 071662 | 3/2003 |

* cited by examiner

*Primary Examiner*—Jose V. Chen
(74) *Attorney, Agent, or Firm*—Kirschstein et al.

(57) ABSTRACT

Electrical contact between a probe and a holder and/or a workpiece is detected by a detection circuit in a machine tool having a spindle located above a movable table. The probe is mounted on a chuck which is, in turn, mounted on the spindle. An arm is also mounted on the spindle. The probe, chuck and arm all form an electrically conductive assembly. A magnetic electrode or a clip electrode is mounted on the assembly, each electrode being electrically connected to the detection circuit.

12 Claims, 15 Drawing Sheets

Fig. 3
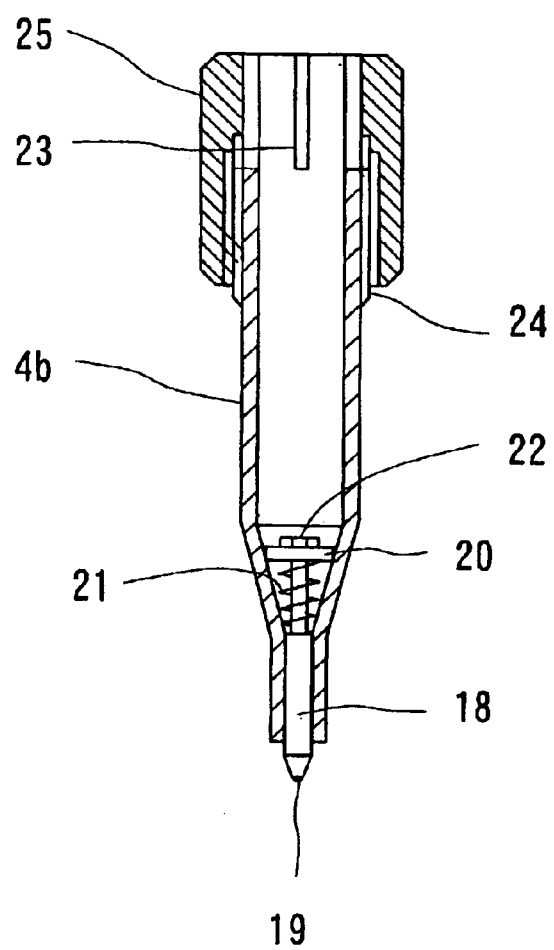
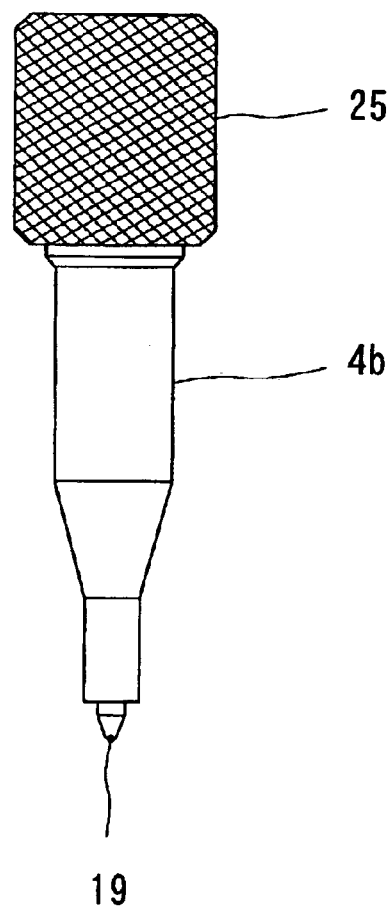

Fig. 11
A
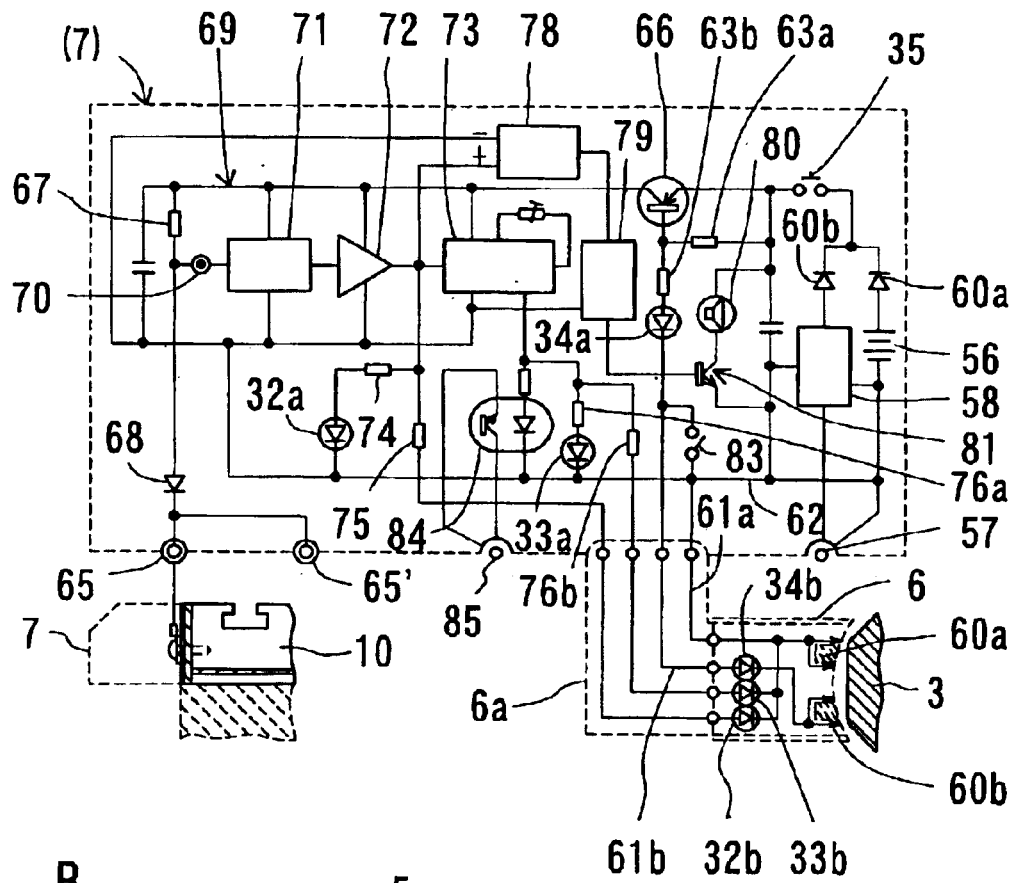
B
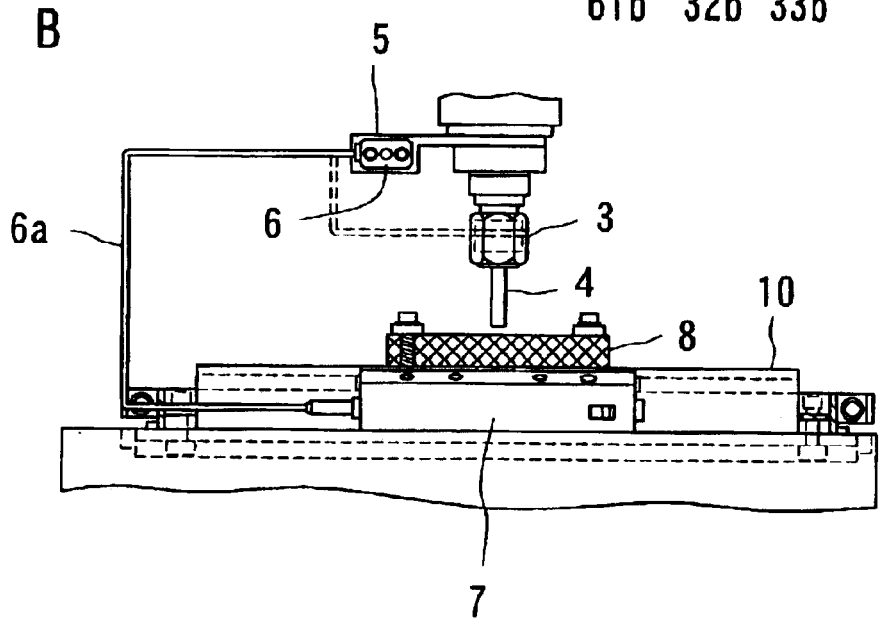

Fig. 12
A
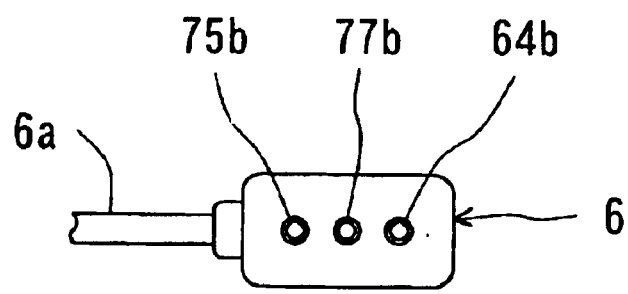
B
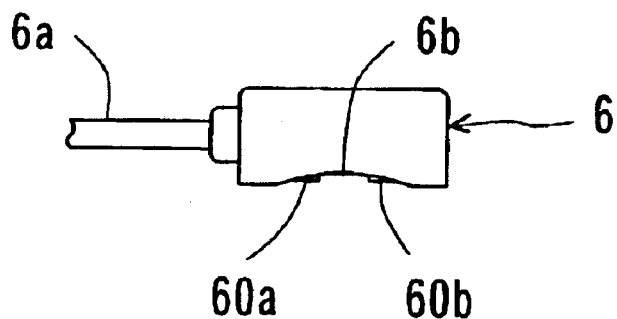
C
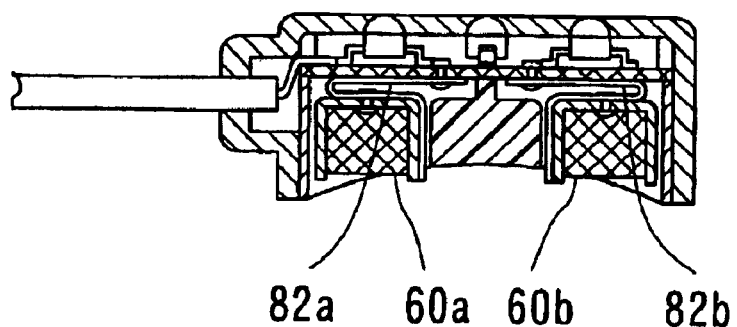

ADAPTER TABLE APPARATUS HAVING SENSOR FUNCTION

BACKGROUND OF THE INVENTION

1. Field of the Invention

The present invention relates to an adapter table apparatus having sensor function for fixing a work-piece that is used for positioning or centering for compact machine tool with a vertical main spindle.

2. Description of the Prior Art

A centering bar in which a measuring terminal eccentrically rotates until contacting a work-piece has been generally provided as a device for precisely performing positioning or centering in a machine tool. An operator visually confirms a moment when convergence of eccentric rotation and slice occur. Such position is determined as a reference. Even a skilled operator cannot easily and instantaneously catch a convergence state of such measuring terminal.

A touch sensor for automatic fine detection and an light emission alarm type centering bar have been provided as attempts to automate confirmation of the state of the centering bar. In accordance with the touch sensor, the moment when eccentrically rotating centering bar contacts a work-piece is electrically detected. Thus, a structure is highly complicated and extremely expensive device is provided.

In accordance with the light emission alarm type centering bar, when the centering bar contacts the work-piece, a conducting circuit from a main spindle via a machine main body to a stock vice is closed. Then, an LED is emitted and a buzzer rang. Attention must be paid to detect the moment of contact by such signal. In the electrically conducting circuit of the machine, a contact resistance such as a ball bearing of the main spindle or a stock vice supporting mechanism may be varied depending on a type of machine or a usage state. Further, as a contact detection circuit, a battery, light emission means and sound means are incorporated into the centering bar, the centering bar becomes a large size and cannot be applied to a compact machine.

Centering of work-piece or positioning of origin especially when one product is manufactured by a compact milling machine or a drilling machine is performed as follows. Namely, the work-piece is marked at any portion thereof and then centering or positioning is performed by using a gauge, a dial gauge, a digital scale or a score by the naked eye. Alternatively, a tool is rotated and the tool contacts a side surface of work-piece. A reference position is determined by a change of sound at this moment. In order to compensate for inaccuracy, trial cutting or milling is performed. Thus, additional labor and cost are required.

SUMMARY OF THE INVENTION

An object of the present invention is to provide a stock vice related device usable in a compact machine tool that a measuring probe instead of a centering bar, a reliable electrical conducting function between the probe or tool and a work fixing tool instead of machine main body and a light emission alarm function are provided or electrically connected.

In order to accomplish the aforementioned object, the present invention provides an adapter table apparatus having sensor function for fixing a work-piece which is attached to an X-Y table of machine tool, comprising: an adapter table including a main body for fixing the work-piece and a member worn to and electrically insulated from the main body, directly mountable to the X-Y table; a magnet electrode that is used for magnetically attracting electrode means to a collet chuck at a distal end portion of vertical main spindle of the machine tool, or an electrode holding member fixed to a distal end sleeve of the vertical main spindle so as to be electrically contactable; and an operating panel that accommodates a circuit for detecting electric contact of first and second contact means, first of which is a conductive surface of the work-piece or a surface of main body of the adapter table which fixes the work-piece and second of which is a distal end portion of tool or contact detection probe means gripped by the collet chuck by providing paired detection input sections which are connected to the main body of the adapter table which electrically contacts the first contact and the magnet electrode which electrically contacts the second contact means.

In accordance with the present invention, instead of the magnet electrode in the adapter table having sensor function, a clip electrode which grips a tool or a contact detection probe means gripped by a collet chuck at a distal end portion of vertical main spindle of the machine tool and electrode holding means fixed to a distal end sleeve of the vertical main spindle so as to be electrically contactable may be used. Accordingly, paired input lines of the contact detection circuit are connected to the main body of the adapter table which electrically contacts the first contact means and the clip electrode which electrically contacts the second contact means.

In accordance with the present invention, the clip electrode comprises a pliers-like metallic unit formed of a stable piece and a movable piece, distal end portions of the stable piece and the movable piece are always urged by a spring loaded at a crossing portion of the stable piece and the movable piece such that paired grip end portions which press-contact with each other are formed, conductive metallic bristles are applied to opposing surfaces each of which is formed between a distal end of grip end portion and the crossing portion so as to mesh with each other, so that a shank portion of the tool or the contact detection probe means or electrode means fixed to and connected to the distal end sleeve of the vertical main spindle is gripped so as to be slidable and electrically contactable.

In accordance with the present invention, in the probe means, a probe gauge is protruded from a distal end of shank-shaped sleeve, a rear end of the probe gauge within the shank-shaped sleeve abuts against a buffer slider so as to be supported by the same, the buffer slider is spring-supported from a rear end of the shank-shaped sleeve so as to press the probe gauge, a collar portion of the probe gauge is anchored to a distal end opening portion within the shank-shaped sleeve, so that a play including returning retracting and deflection of distal end of the probe gauge is provided.

In accordance with the present invention, the table according to any the above constitutions, wherein in the probe means, a distal end portion of ball receiving shaft is protruded from a distal end portion of sleeve-shaped probe main body that is extended from a reduced diameter portion of cone formed at the sleeve-shaped main body, a rear end of ball receiving shaft is formed as a slim core shaft, the core shaft is guided to a central hole of guide portion which is fixed to a wide opening side of the cone formed at the probe main body, the ball receiving shaft is pressed by a coil spring which is inserted between the guide portion and an end of the core shaft of the ball receiving shaft, so that the ball receiving shaft is maintained at a position that a distal end of core shaft is anchored to the guide portion, a clamp ring for clamping in a chuck manner a shank of tool inserted into the probe main body is provided at a rear end of probe main body, a probe that is detachable with respect to the tool and in which a ball supported at the distal end is used for a stylus is structured.

BRIEF DESCRIPTION OF THE DRAWINGS

FIG. 3A is a vertical sectional view of detachable probe used for the embodiment of the present invention.

FIG. 3B is a side view of the detachable probe used for the embodiment of the present invention.

FIG. 11A is a circuit diagram showing an operating panel circuit of the present invention.

FIG. 11B is an arrangement view of mounting cable in the circuit of the present invention.

FIG. 12A is a plan view of magnetic electrode serving as an electric connection terminal from the probe.

FIG. 12B is a side view of the magnetic electrode described above.

FIG. 12C is a side sectional view of the magnetic electrode described above.

DESCRIPTION OF THE PREFERRED EMBODIMENTS

Figure 1:
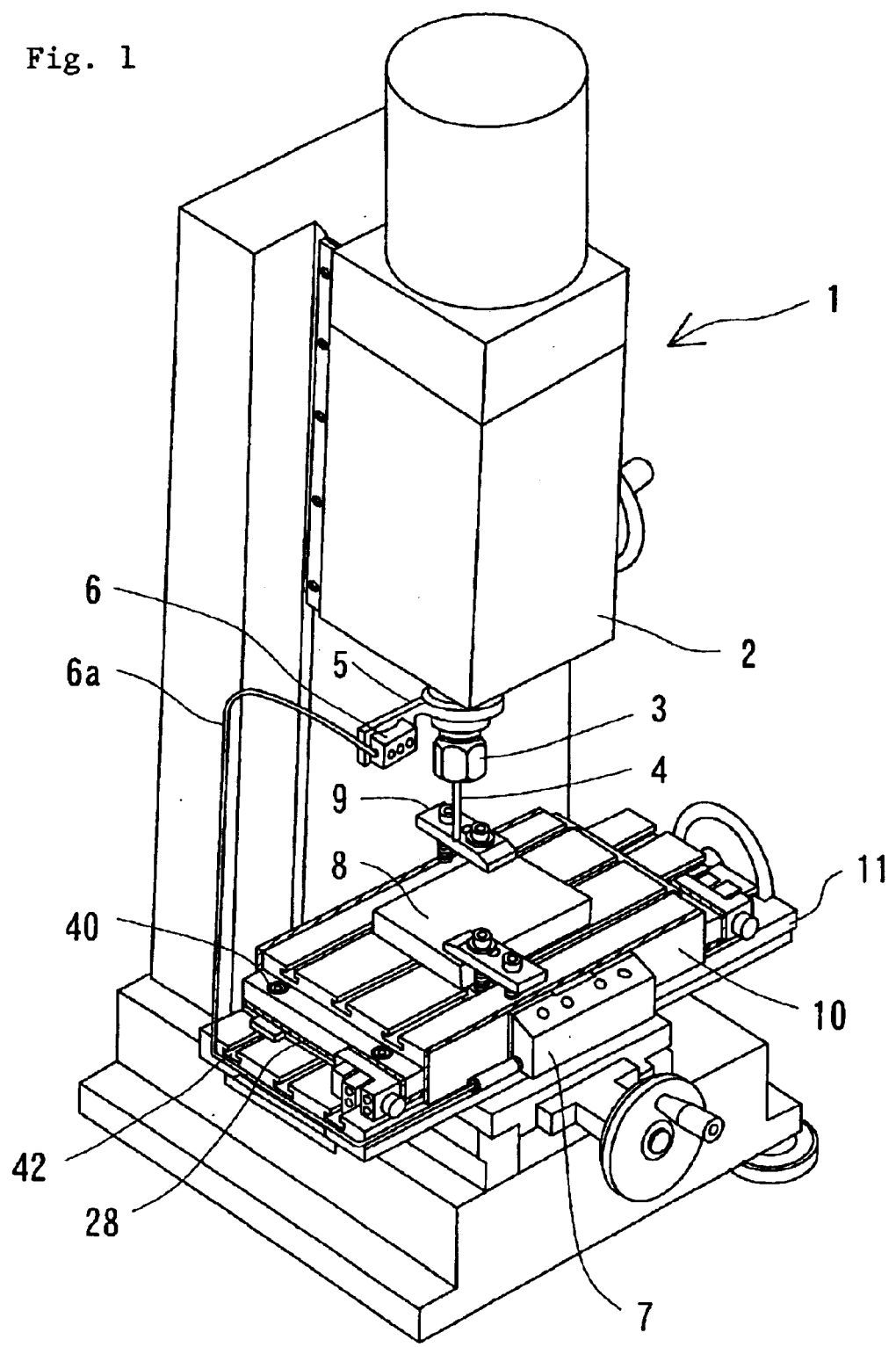
FIG. 1 is a perspective view showing an example of machine tool to which the present invention is applied.

FIG. 1 shows an exterior of embodiment that a stock vice of the present invention is used for a milling machine. Referring to FIG. 1, a probe 4 serving as a centering or positioning element is held by a collet chuck 3 at an end of main spindle which is protruded downward from a spindle housing 2 of milling machine 1. In this case, the probe 4 is electrically conductively connected to a magnet electrode 6 which has a display panel and is magnetically attracted to a distal end of metallic arm 5 which is mounted to a main spindle sleeve disposed above the collet chuck 3. Further, the probe 4 is conducted via an electric cable 6a extended from the magnetic electrode 6 to an operating panel 7 which has a function of detecting contact with a work-piece and other functions.

A specific core wire in the electric cable 6a serves as one line of a pair of detection input lines for a contact detection circuit included in the operating panel 7. An adapter table 10 of the present invention which has a work-piece 8 and a work-piece holder 9 for clamping and fixing the work-piece 8 serves as another input line. The operating panel 7 is fixed to a front side surface of the adapter table 10 by a screw or the like. The screw constitutis a contact detection input terminal for a circuit to be described later. The table 10 is mounted on a main machine X-Y table 11 as described later.

Figure 2:
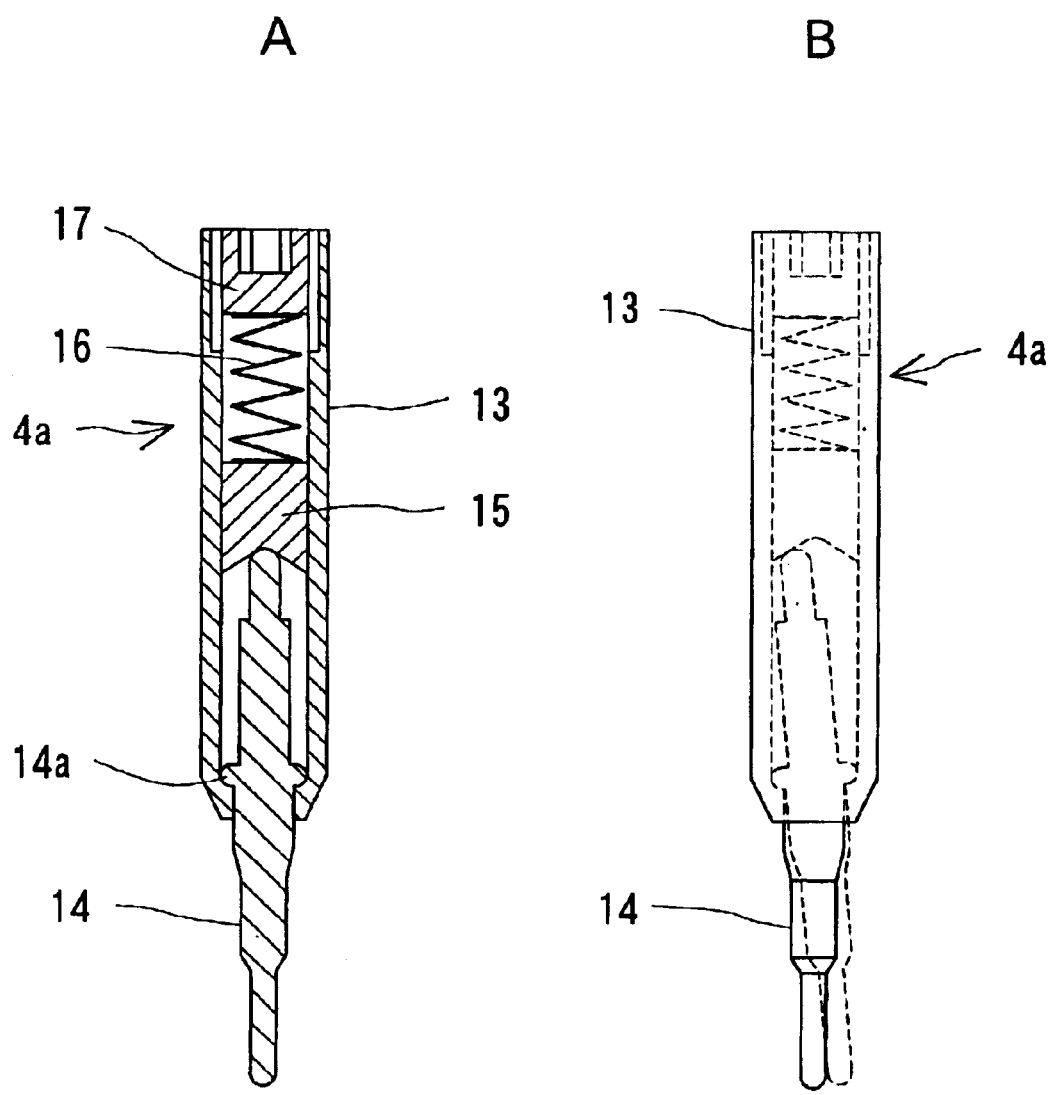
FIG. 2A is a vertical sectional view of dedicated probe used for an embodiment of the present invention.
FIG. 2B is a side view of the dedicated probe used for an embodiment of the present invention.

FIGS. 2A and 2B show a dedicated probe which serves as gauge for initial setting and sensor among probes serving as input terminals for the contact detection circuit. Referring to FIG. 2A, in a dedicated probe 4a, a probe gauge 14 is protruded from a distal end of shank-shaped sleeve 13. A rear end of the probe gauge within the sleeve 13 abuts against a buffer slider 15 and is supported by the same. The buffer slider 15 presses the probe gauge 14 by being supported by a spring 16 from backward (upward in the figure), so that the probe gauge 14 is maintained at a position that a collar portion 14a thereof is anchored to a distal end opening of the shank sleeve 13. A reference numeral 17 indicates a screw for gauge exchange and adjustment which also functions as a spring seat for the spring 16. A play outliningly shown by broken lines of FIG. 2B is provided for a case that a side surface of the probe gauge 14 abuts an object to be positioned (work-piece or stock vice). An available pin gauge can be effectively utilized for the probe gauge 14.

FIGS. 3A and 3B show a second probe, i.e., a detachable probe 4b for centering which is set to operating or mounted end mill or shank of drill. Referring to FIG. 3A, a probe main body 4b is formed in a sleeve shape. A distal end of ball receiving shaft 18 serving as a probe shaft is protruded from a distal end portion which is extended from a reduced diameter portion of a cone formed at the main body. A ball 19 at the distal end of the ball receiving shaft is used as a stylus for searching a hole or a punch hole formed at a work-piece. In this way, fine adjustment for centering or positioning is performed.

A slim core shaft is formed at a rear end of the ball receiving shaft 18. The core shaft is guided to a central hole of plate-shaped guide portion 20 which is fixed to a broad opening side of the cone formed at the probe main body 4b. The ball receiving shaft 18 is pressed by a coil spring 21 which is inserted between the plate-shaped guide portion 20 and an end of the core shaft. In this way, the ball receiving shaft 18 is maintained at a position that a head nut 22 placed at the distal end of the core shaft is anchored to the plate-shaped guide portion 20. The rear end of the probe main body 4b is provided with a slit 23 serving as a play at a time of being shrunk in a direction of reducing a diameter when a shank of tool is clamped. A clamp ring 25 which is engaged with a thread 24 formed toward a bottom portion of the slit 23 is placed at an outer periphery of the rear end of the probe main body 4b.

Figure 4:
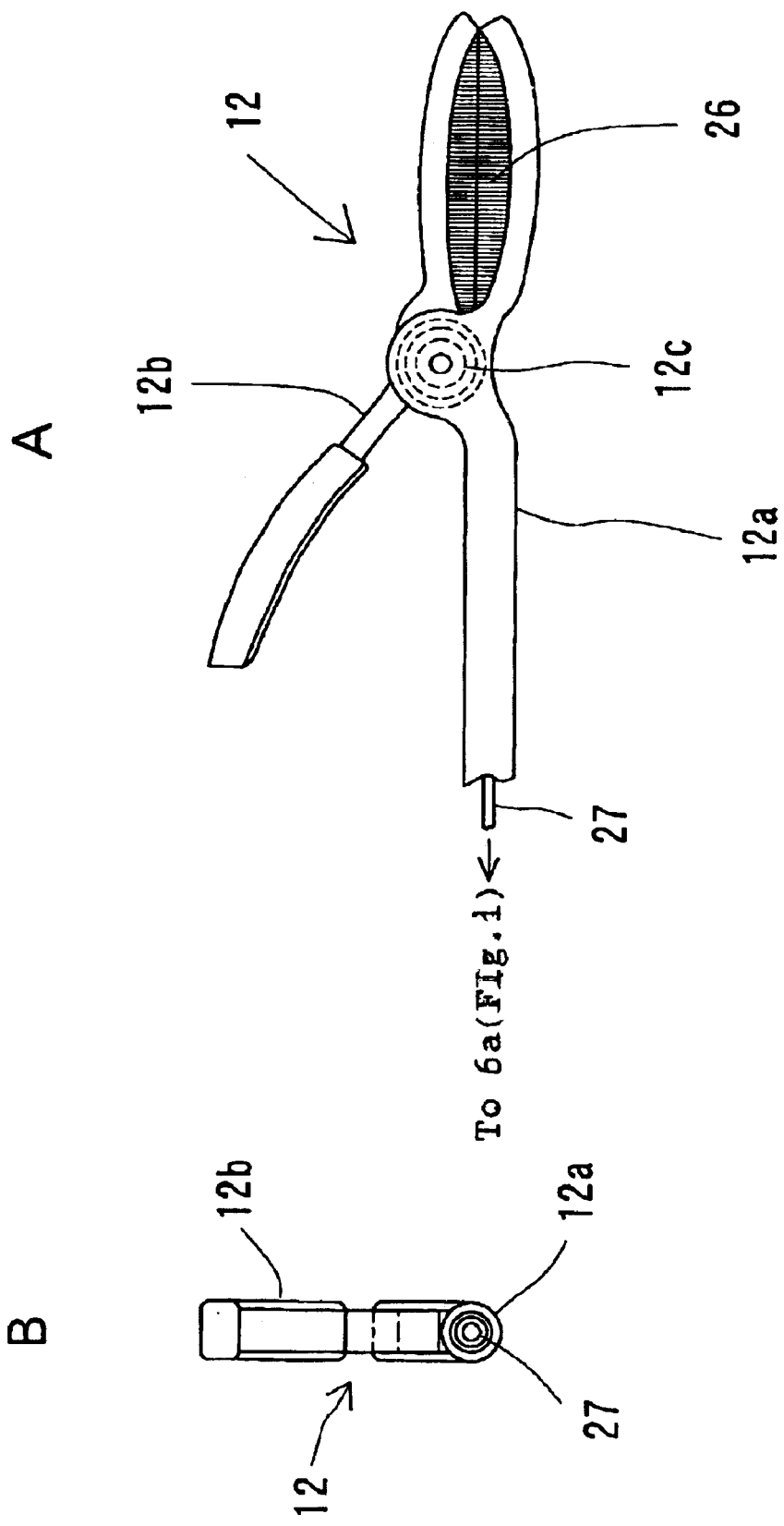
FIG. 4A is a side view of clip for electric contact with a probe according to the embodiment of the present invention.
FIG. 4B is a rear view of the clip for electric contact with a probe according to the embodiment of the present invention.

FIGS. 4A and 4B show main portions of clip electrode 12 for nipping the above-described probe 4 instead of the magnet electrode 6 shown in FIG. 1. The clip electrode 12 is formed of a pliers-like metallic unit. A stable piece 12a and a movable piece 12b are always urged by a spring mounted to their crossing portion 12c such that distal end portions (grip end portions) of the stable piece and the movable piece press-contact. Conductive bristles 26 are applied to a portion between the distal end portion of either of the pair of grip end portions and the crossing portion 12c so as to mesh with bristles formed at a portion between the distal end portion of another of the grip end portion pair and the crossing portion 12c. A lead wire 27 which is conductively coupled to the metallic bristles 26 of the stable piece is extended toward the rear end of the stable piece and connected to the cable 6 (FIG. 1).

Figure 5:
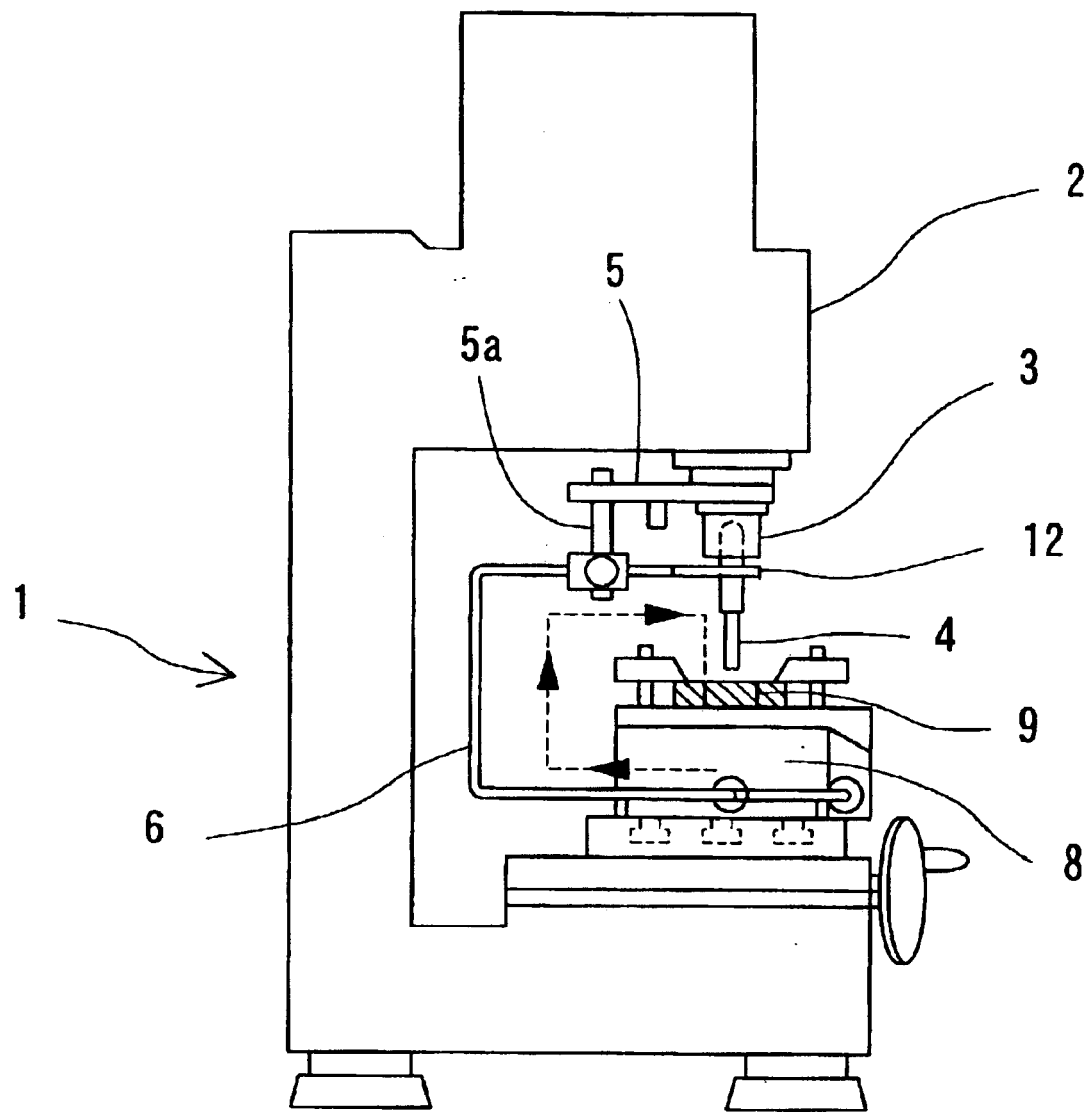
FIG. 5 shows a typical aspect of using the clip electrode.

FIG. 5 shows a typical aspect of using the clip electrode 12. The clip electrode 12 is supported by, e.g., a clip supporting rod 5a which is suspended from a distal end of the metallic arm 5 which is protruded from the main spindle sleeve. At this position, the shank portion of the probe 4 can be nipped, as shown in FIG. 5, by the metallic bristles 26 at the grip end portions substantially without contact resistance. Further, a shank of end mill or drill can also be nipped. This aspect can be applied to a case in which such tool is rotating.

Figure 6:
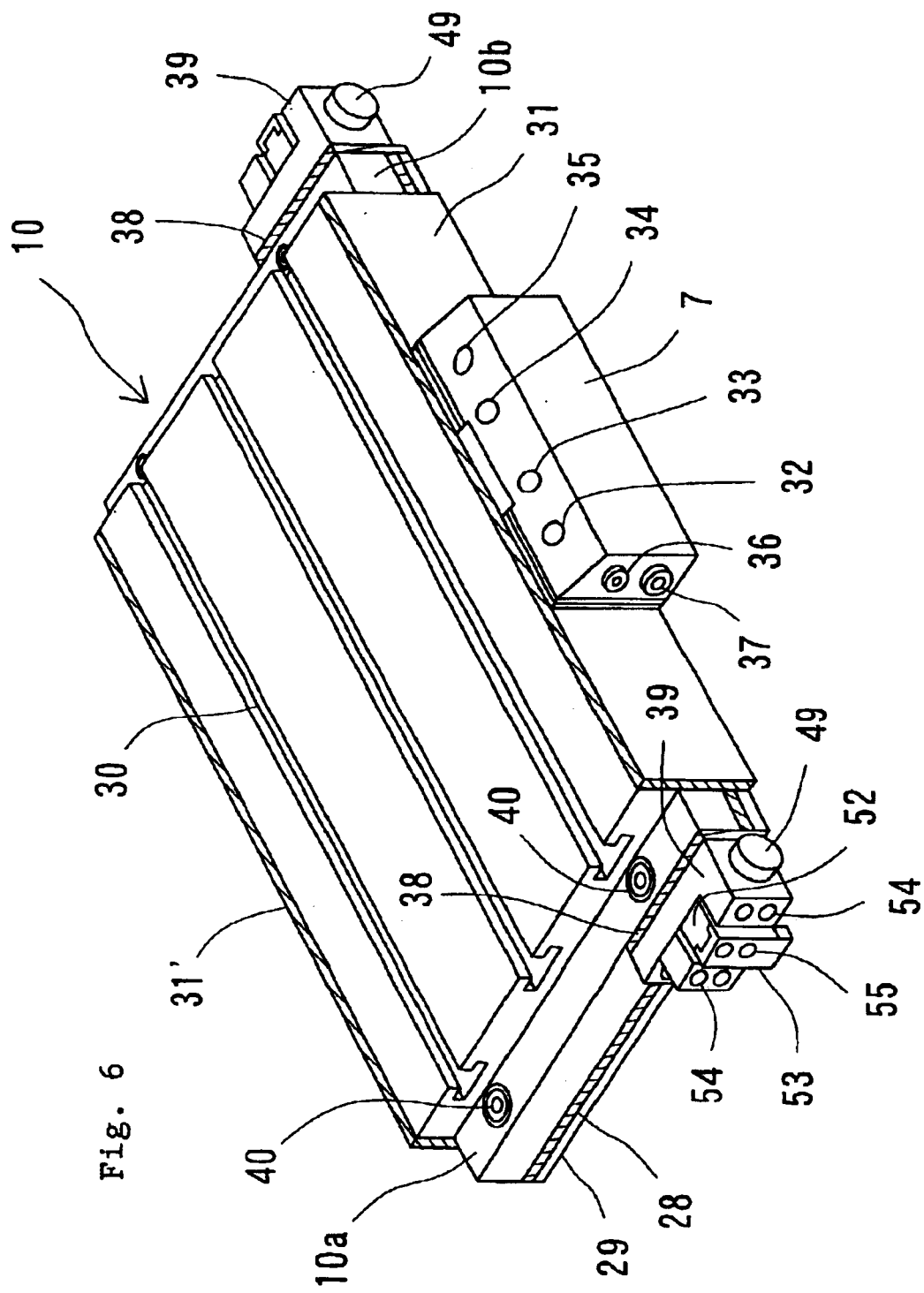
FIG. 6 is a perspective view showing a basic embodiment of stock vice of the present invention.

FIG. 6 shows a perspective view of the adapter table 10 which comprises the operating panel 7 serving as the main portion of the present invention. As a main body portion of the table 10 has functions of stock vice and X-Y table, the main body portion is made of hard steel alloy which is the same as the main machine X-Y table 11. The table 10 is supported by the X-Y table 11 (FIG. 1) while maintaining electric insulation. For this reason, a high quality insulating plate 28 is adhered to a back surface of the main body portion of the table 10. The insulating plate 28 is further adhered to a protective plate 29 which is formed of a finished plate with quenched surface and protected by the same. The protective plate 29 is contact-supported by and fixed to the main machine X-Y table 11.

A plurality of grooves 30 with inversed T-shaped configuration are formed on the surface of the main body portion of the table 10 along a lengthwise (transverse) direction. Insulating covers 31, 31' are attached to a front surface and a rear surface of the main body portion. The operating panel 7 is mounted to the insulating cover 31 at the front surface. The operating panel 7 has, at its upper surface, a contact state display LED 32, a certain time display LED 33, an electrode detaching display LED 34 and a power source switch button 35. An exterior output terminal 36 and a magnet electrode connector jack 37 are provided at a left side surface of the operating panel 7. A table X axis positioning frame 39 is mounted via an insulating plate 38 to a front end of each of shelf-shaped portions 10a, 10b disposed at left and right side surfaces of the table 10.

Figure 7:
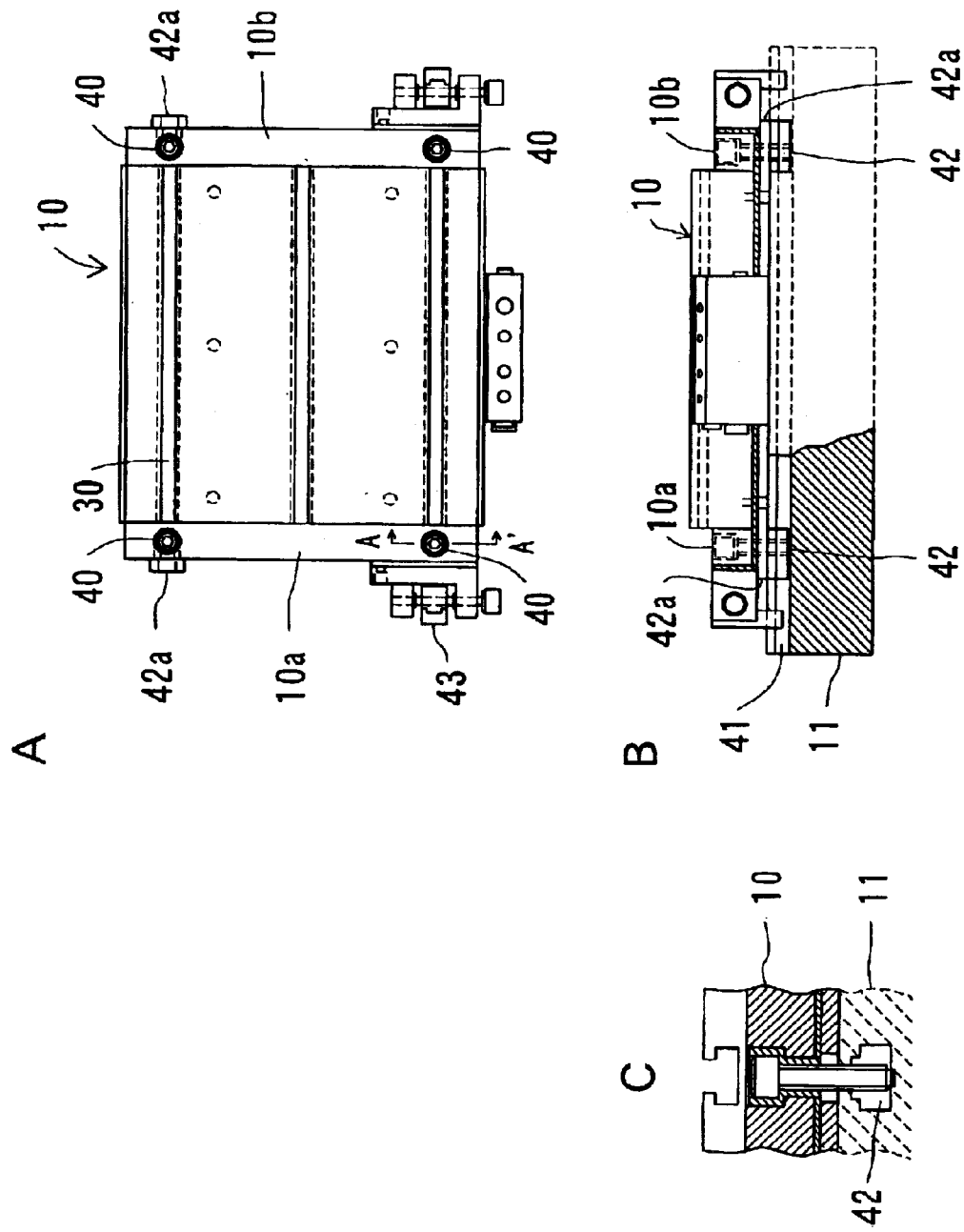
FIG. 7A is a plan view of the stock vice of FIG. 6.
FIG. 7B is a front cross-sectional view of the stock vice, including a partially broken cross-sectional view.
FIG. 7C is a cross-sectional view of FIG. 7A taken along a line A–A'.
Figure 8:
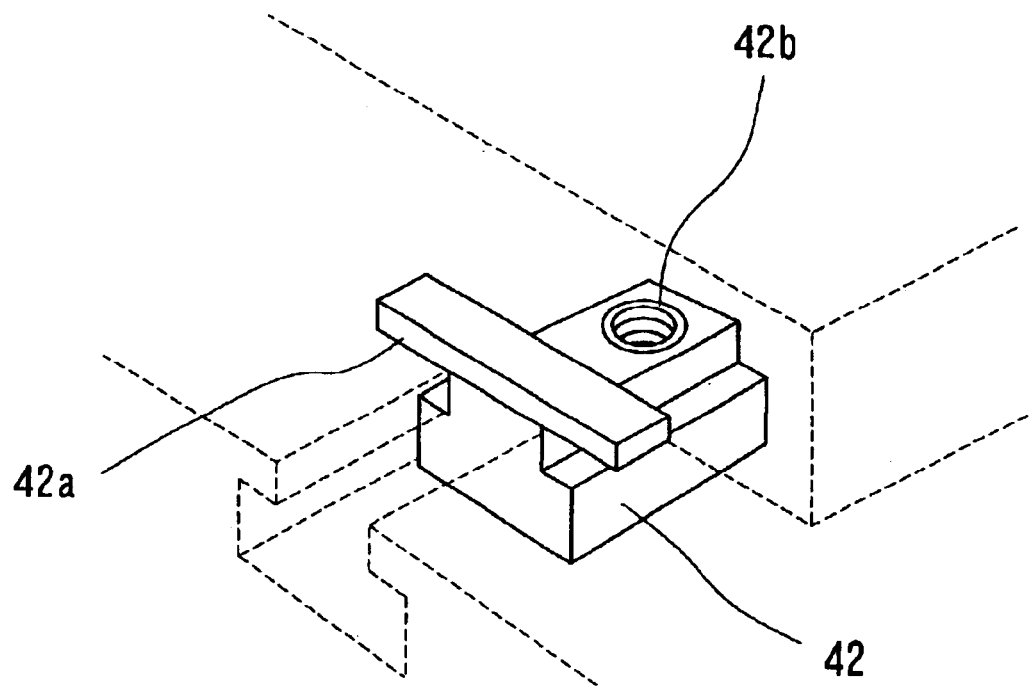
FIG. 8 is a perspective view of T block nut for fixing the adapter table of the present invention to a main machine X-Y table.

Mounting holes 40 for the main machine X-Y table 11 are placed at the front and rear ends of each of the shelf-shaped portions 10a, 10b at the right and left side surfaces. As shown in FIG. 7, a bolt which is inserted into each of the mounting holes 40 is screwed into a T block nut 42 inserted into an inversed T-shaped groove 41 at the main machine X-Y table 11. As a result, the adapter table 10 is fixed to the table 11. A reference numeral 42a indicates a lock piece of the T block nut 42. When the lock piece 42a abuts each of the shelf-shaped portions 10a, 10b at the left and right side surfaces, a screw hole of the nut 42 is aligned with the mounting hole 4. An outline of the T block nut 42 is shown in FIG. 8. A main body of the nut 42 has an inversed T-shaped cross-section. The lock piece portion 42a is fixed to or integrally formed with one end of a top surface. The screw hole 42b is formed at another end.

Figure 9:
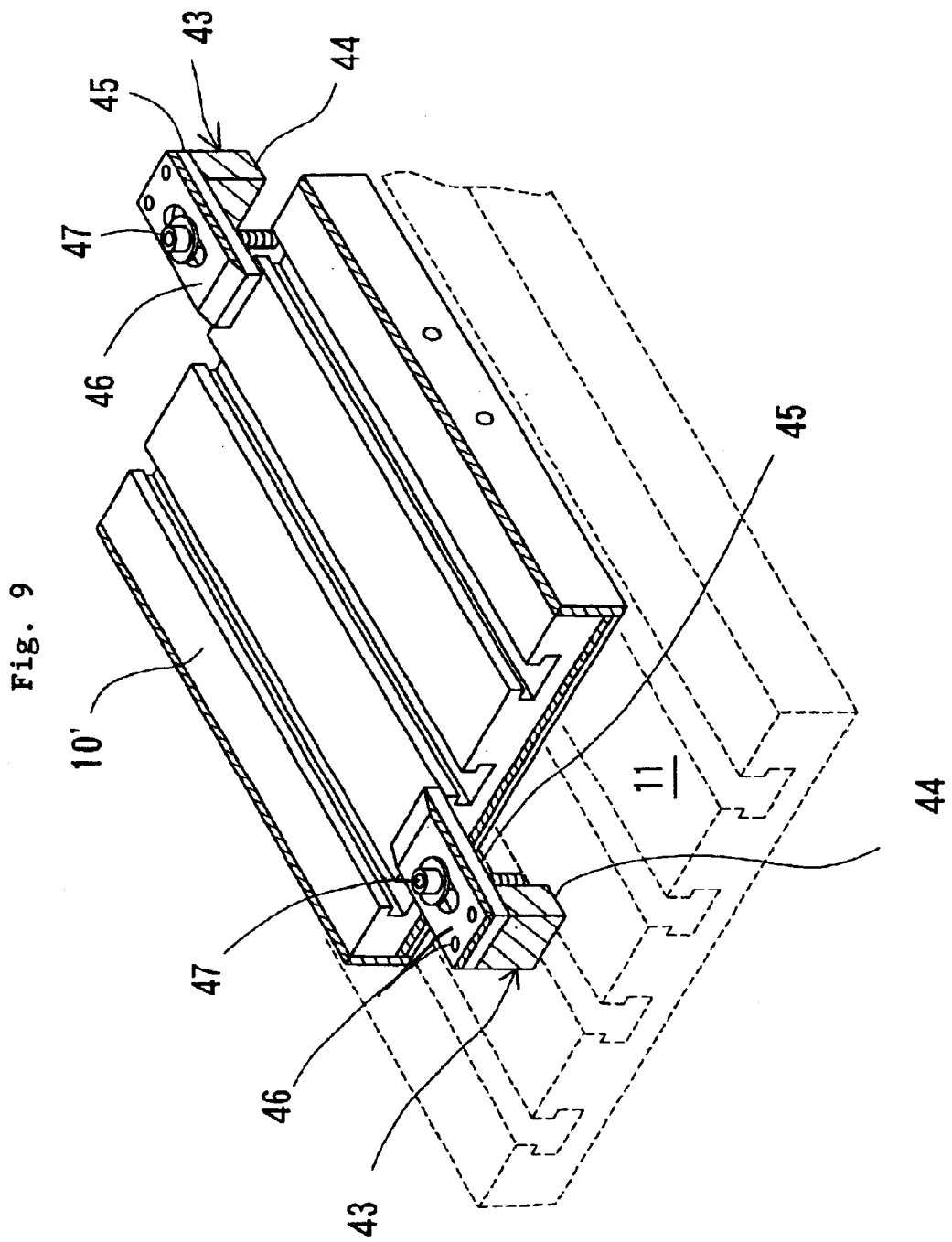
FIG. 9 is a perspective view showing a state of simply fixing the adapter table of the present invention to the main machine X-Y table using an L-shaped clamp piece.

FIG. 9 shows a state of temporarily fixing an adapter table 10' which does not have shelf-shaped portions for fine positioning at left and right side surfaces to the main machine X-Y table 11 by an L-shaped clamp piece 43. The L-shaped clamp piece 43 is formed of an insulator leg 44 which stands upright on the surface of the X-Y table 11, a clamp piece main body 45 made of quenched steel plate with its one end being fixed to the insulator leg 44 and an insulating plate 46 which coats the surface of the clamp piece main body 45. A bolt 47 which is inserted via a washer into an elongated hole passing through the main body 45 and the insulating plate 46 is screwed into a T nut (not shown) hidden in the inversed T-shaped groove of the X-Y table 11. As a result, the adapter table 10' can be fixed.

Figure 10:
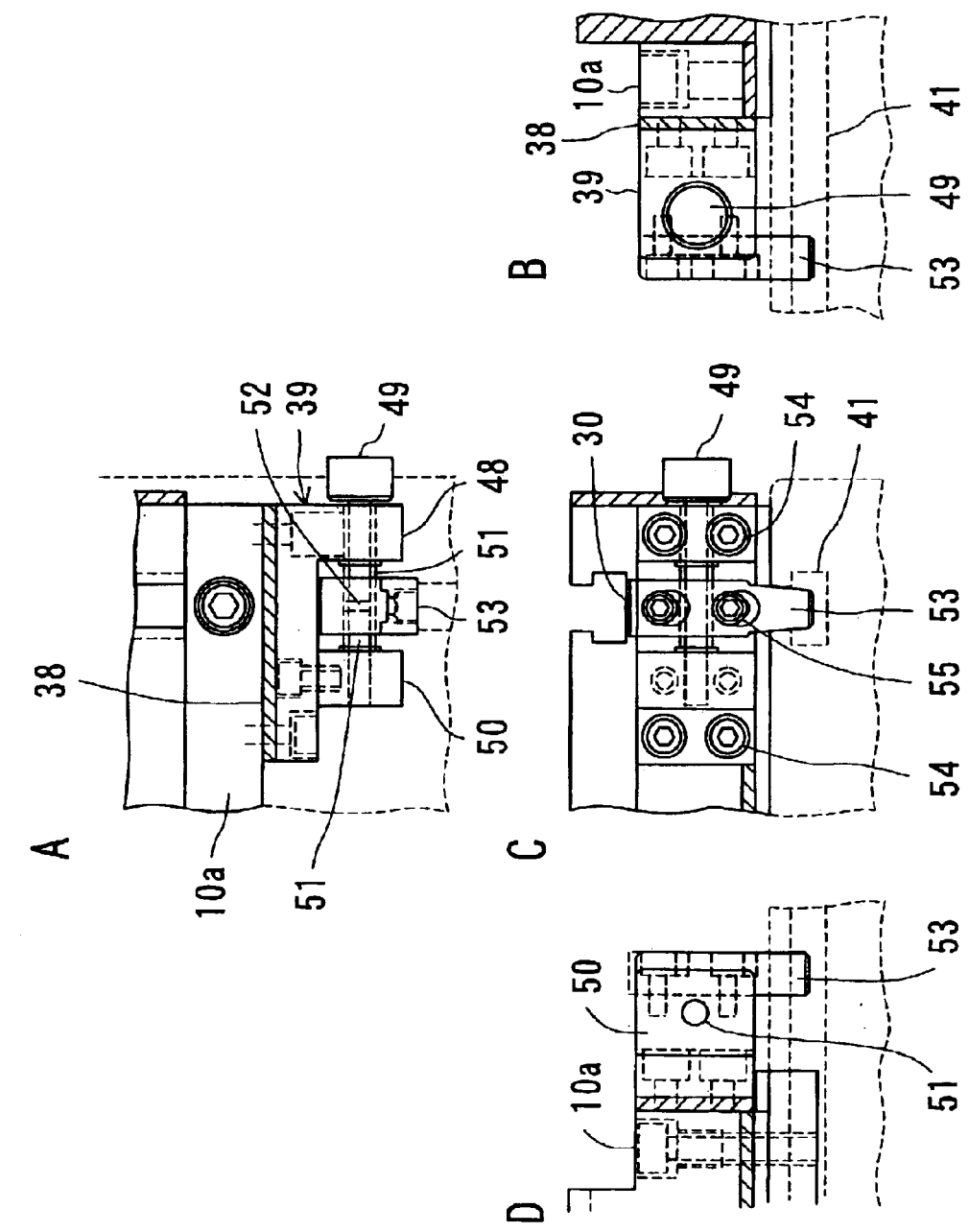
FIG. 10A is a partial plan view of table showing a detailed structure of axial direction positioning frame for the adapter table of the present invention.
FIG. 10B is a partial front view of the table described above.
FIG. 10C is a partial side view of the table described above.
FIG. 10D is a rear view of the table described above.

The frame 39 for axial direction positioning of the table 10 will be described with reference to FIGS. 6, 9 and 10. The frame 39 has an adjustment knob 49 which is protruded from a front surface of lateral bent portion 48 at the front end. The reason why fine positional adjustment by the knob 49 is required is as follows. Namely, at a time of mounting the adapter table 10 by screwed into the T block nut 42, variations in the X axis are generated (the adapter table 10 is not precisely parallel to the main machine X-Y table 11) depending on a difference between fastened states of the screws (because the mounting hole 40 has a small room for passing through a screw). The knob 49 is formed as a head for sliding screw 51 which is free revolving bridged and supported between the lateral bent portion 48 and a lateral protrusion 50 at a rear portion of the frame 39.

When the knob 49 is rotated and a relative position of slide block 52 which is supported by (screwed into) the slide screw 51 is finely adjusted, the position of the adapter table 10 relative to the main machine X-Y table 11 is finely adjusted by an integrally formed tapered pin 53 inserted into the inversed T-shaped groove 41 formed at the main machine X-Y table 11. An operator obtains a precise position of the table 10 with respect to left and right side surfaces thereof by the fine adjustment. Then, the operator can strongly fasten the aforementioned screw within the mounting hole 40 which is temporarily fastened until the screw is set. The positioning frame 39 is fixed, by a bolt 54 with insulating bush, via the insulating plate 38 to each of the shelf-shaped portions 10a, 10b at the left and right side surfaces. The tapered pin 53 is fixed to the slide block 52 by a fixing screw 55 with insulating bush.

FIG. 11A shows a structural example of circuit for detecting contact between a probe and a work-piece (adapter table) within the operating panel 7 in which the above-described exterior elements 32 to 36 are disposed. Such elements are indicated by circuit element symbols to which the same reference numerals are attached. Referring to FIG. 11A, the magnet electrode 6 with display panel is magnetically attracted to the collet chuck 3 which holds the probe gauge 4 and conductively connected to the same. Referring to a partial front view of FIG. 11B, the magnet electrode 6 with display panel is, as in FIG. 1, magnetically attracted to the distal end of the metallic arm 5 and conductively connected to the same. Further, the magnet electrode 6 is, as in FIG. 11A, also attracted and fixed to the collet chuck 3 as shown by broken lines. A conductivity between the probe gauge 4 and the magnet electrode 6 in FIG. 11A is not substantially different from that of FIG. 11B. Thus, a difference in a circuit operation is not generated. "An operating panel circuit (7)" refers to as the whole circuit within the operating panel 7.

In the operating panel circuit (7), when the magnet electrode 6 with display panel is magnetically attracted to the collet chuck 3, a pair of contacts 60a and 60b with magnetic path within the magnet electrode 6 is short-circuited via the surface of the attracted collet chuck 3. The contact 60a is connected via the core wire 61a in the electric cable 6a to a common line 62 within the operating panel circuit. On the other hand, a plus voltage of power source within the operating panel circuit is connected via a protective circuit 58 with functions of noise filter and over-voltage absorption to a power source side contact of the switch 35 from a built battery 56 or an exterior adapter power source (not shown) connected to an adapter terminal 57. The circuit side contact of the switch 35 is connected via voltage dividing resistances 63a, 63b, an LED 34a, the cable core wire 61c and an LED 34b within the magnet electrode 6 to the shorted contact 60a or 60b with magnetic path.

Accordingly, when the power source switch 59 is turned on, a circuit from the switch via the LEDs 34a, 34b and contacts 60a, 60b to the common line 62 (minus line for the power source) is connected between ends of direct current power source 56 or 58. Thus, the LEDs 34a and 34b are switched on and display an on state of the operating panel circuit (7). Then, when the probe 4 mounted to the collet chuck 3 contacts the work-piece 8, the table 10 which supports (electrically contacts) the work-piece 8 and is insulated from the machine tool main body is conducted via the contact 60a or 60b with magnetic path to the common line 62. The table 10 serving as a conductor is represented by the connection terminal 65 in the operating panel circuit. Thus, the common line 62 and the connection terminal 65 form an input portion in a contact detection circuit.

A contact detection circuit 69 is formed of a transistor 66, a detection resistance 67 and a counter current preventing diode 68 and inserted in series between the power source switch 35 and the connection terminal 65 in the operating panel circuit (7). In the contact detection circuit 69, since the transistor 66 has a base connected to nodes of the voltage dividing resistances 63a and 63b, a base current flows. Collector-emitter is perfectly conducted by the contact detection circuit 69 being closed by contact of probe. A node of the detection resistance 67 and the diode 68 that is connected via a collector resistance of the transistor 66 which is open in an ordinary state (in a non-contact state of probe) to the source voltage 8 (e.g., 5V) has the same potential as that of the common line 62 (zero potential) via the diode 68 and the connection terminal 65 by a current flowing through the contact detection circuit 69. A lighting timer circuit originated from a check terminal 77 is urged.

The lighting timer circuit is formed of a noise limiter 71 made of CR filter, a schmitt trigger 72 and an one shot timer 73. When an input of the noise limiter 71 is stabilized at a low level, the schmitt trigger 72 has a predetermined output level. An operating panel side contact state LED 32a and a magnet electrode side contact state LED 32b are lit via resistances 74 and 75. Further, the one shot timer 73 which receives a predetermined output of the schmitt trigger 72 generates a delayed output which lasts for 1 to 2 seconds and lights an operating panel side certain time LED 33a and a magnet electrode side certain time LED 33b via resistances 76 and 77.

Functions of aforementioned contact state LEDs 32a, 32b and certain time LEDs 33a, 33b will be described. In positioning between a probe and a work-piece, the LEDs 32a and 32b light only when the probe contacts the work-piece (such display is of course effectively utilized) If the probe contacts the work-piece for only an instant and then the LEDs light for only an instant, such lighting may be missed. Further, if contact of the probe with the work-piece is instable in spite of continuous contact, the LEDs are turned on and off and thus such lightning is hardly seen. Thus, the LEDs 33a and 33b light for 1 to 2 seconds even in an instantaneous contact such that an operator does not miss lighting.

An output of the schmitt trigger 72 is connected to a positive input of second one shot timer 78 which forms a sound timer circuit separately from the aforementioned lighting timer circuit. The one shot timer 78 generates a short time output of less than 0.1 to 0.2 second and such output is supplied to an input of sound oscillation circuit 79. An output of the oscillation circuit 79 is connected to a base of transistor 81 in a sound circuit which is inserted between the power source switch 35 circuit side and the common line 62 and includes a buzzer or a speaker 80. By the transistor 81 being conducted, instantaneous buzzer or speaker sound is generated.

It is assumed that the above-described circuit operations are performed when the power source switch 35 is turned on and then a base potential is established at the transistor 66. Namely, the LED 34a of the base circuit must be electrically connected via the collet chuck 3 to the contact 60a with magnetic path within the magnetic electrode 6 connected to the common line 62 while passing through the series LED 34b and the contact 60b with magnetic path. For this reason, as shown in FIGS. 12A through 12C, the contacts 60a and 60b with magnetic path of the magnet electrode 6 are mounted so as to correspond to a flat distal end portion of the arm 5 shown in FIGS. 1 and 11B and to one outer peripheral surface with narrow side of the polygonal collet chuck 3 shown in FIG. 11A.

Namely, the contacts 60a and 60b with magnetic path are always partially exposed from a concave opening edge 6b of main body case of the magnet electrode 6. The contacts 60a and 60b with magnetic path are attracted to wide metallic flat surfaces by elastic or good conductive metallic plates 82a and 82b such as phosphor bronze plates while slightly being protruded from the concave opening edge 6b. Further, the contacts are attracted while being accommodated within the concave opening edge 6b and narrow metallic flat surfaces being covered with the opening edge 6b. When a state of surface of the collet chuck 3 is inferior, substantial electric connection cannot be obtained by reliably attracted contacts 60a and 60b with magnetic path. Thus, a circuit operation cannot be performed. In order to handle such case, a manual switch 83 is inserted between a cathode of the LED 34a of the base circuit and the common line 62. Thus, the LED 34a can be electrically connected to the common line by the manual switch instead of the contacts 60a and 60b with magnetic path.

An output of probe contact state from the one shot timer 73 which forms the lighting timer circuit is supplied to an LED of photocoupler 84. A collector-emitter voltage of photo transistor which is urged by light emission of the LED can be detected at an exterior monitor terminal 85. An added terminal 65' is connected to the table side terminal 65 of the operating panel circuit (7). When a normal terminal 65 is in a state that a mounting screw is temporarily fastened in an initial setting for machine tool, the added terminal is effectively used when the adapter table 10 or a metallic workpiece supported by the adapter table 10 is not reliably electrically contacted.

Figure 13:
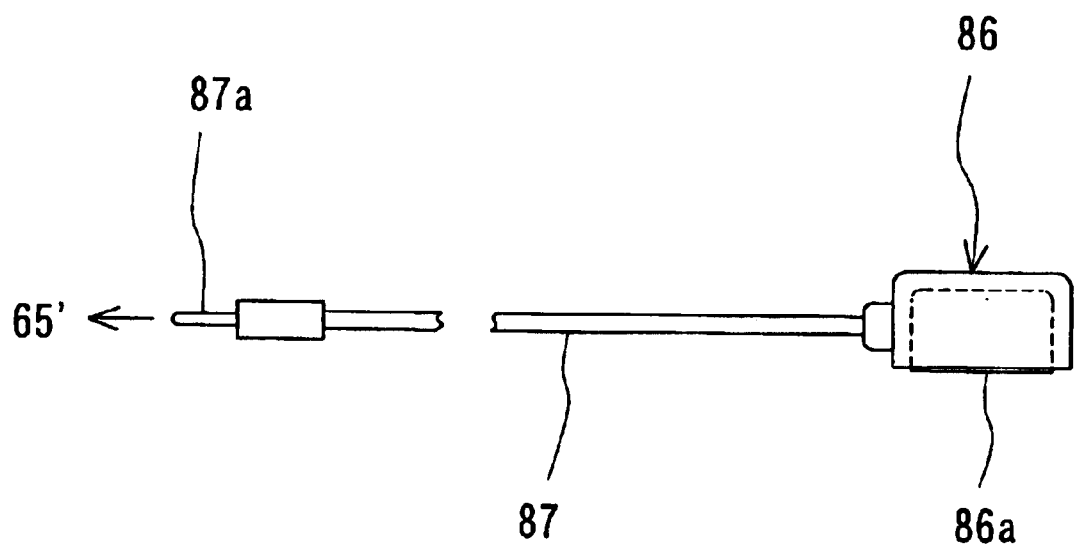
FIG. 13 is a side view of magnetic contact connected to an additional terminal of the operating panel circuit.

As shown in FIG. 13, a magnet contact 86 is connected to the added terminal 65'. An end surface of contact 86a with magnetic path is exposed from an opening surface of main body of the magnet contact 86. A distal end lug portion 87a of lead wire 87 is screwed into the added terminal 65'. In this way, by the magnet contact 86 being magnetic attracted to the adapter table 10 or a metallic work-piece supported by the table 10, the terminal is reliably electrically connected to such contacted object and an operation of operating panel circuit is ensured.

Figure 14:
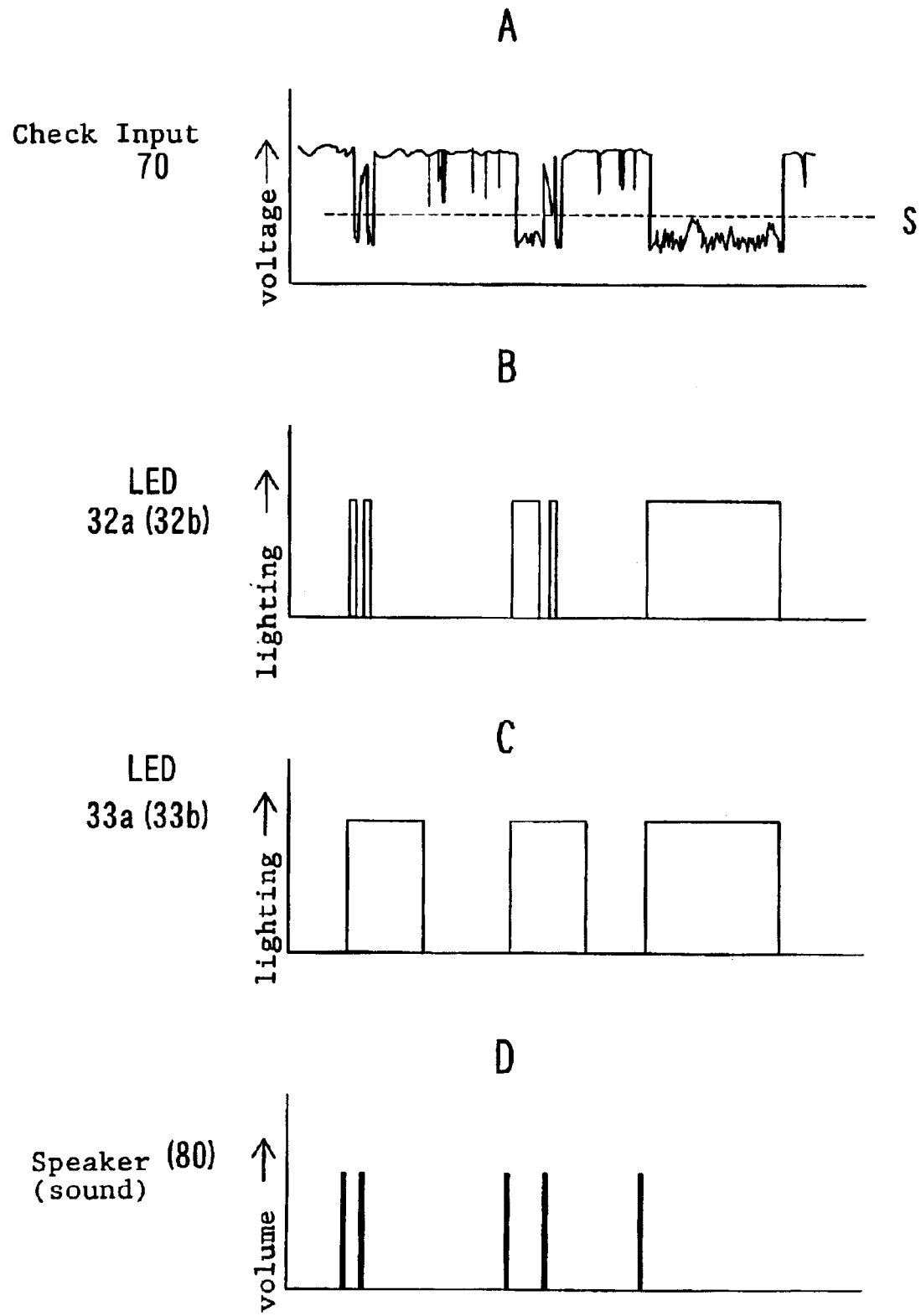
FIG. 14A shows a waveform of checking terminal of the operating panel circuit.
FIG. 14B shows a waveform of lighting directly contacted display LED.
FIG. 14C shows a waveform of lighting continuously contacted display LED.
FIG. 14D shows a pulse waveform of generated speaker sound.

FIGS. 14A through 14D show the respective portions and signal waveforms when the probe 4 fixed to the collet chuck 3 is contacted to the adapter table 10 of the present invention or the work-piece 8 supported by the table 10 for positioning, centering or scale correction. FIG. 14A shows a voltage level of signal of the check input terminal 70 from the contact detection circuit 69 to the noise limiter 71. When the probe 4 does not contact, a collector of the transistor 66 in the circuit 69 is open. Thus, a voltage level of the terminal 70 is high (e.g., 5V) via a collector resistance. The voltage level is slightly linearly decreased for extremely short period of time by the probe 4 slightly contacting. Such slight decrease is ignored as a noise. The voltage level is in a "low" level which is equal to or lower than a threshold level S only when the probe 4 reliably contacts.

An output of the schmitt trigger 72 which receives a noise limit signal of the noise limiter 71 generates a significant rectangular wave signal only during the aforementioned "low" level period, i.e., only when the probe contacts. Then, the LEDs 32a and 32b are lit (FIG. 14B) In contrast, the one shot timer 73 receiving an output of the schmitt trigger 72 generates an output which lasts for about 1 to 2 seconds not so as to miss lighting of the LEDs in a case that the probe contacts for a short time of period. Then, the LEDs 33a and 33b are lit at a recognizable time (FIG. 14C). The another one shot timer 78 which receives an output of the schmitt trigger 72 in parallel generates a sound from a buzzer or a speaker. Such sound is outputted for a short time of period, e.g., for 0.1 to 0.2 seconds or shorter because a notice of contact by the sound of the speaker 80 is easily recognized even for a short time of period and if the sound is heard for a long time of period, the sound is felt noisy (FIG. 14D).

Figure 15:
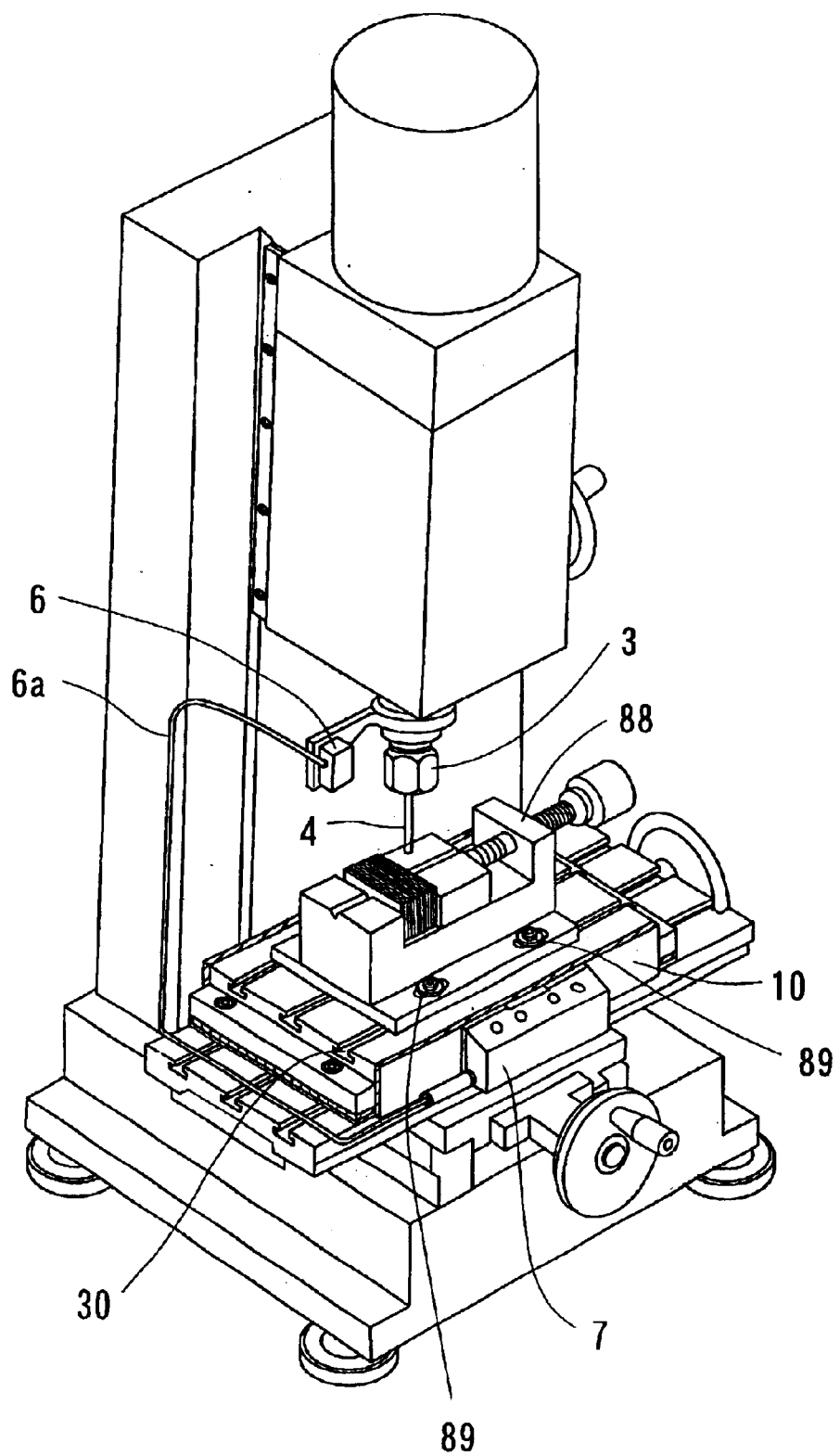
FIG. 15 is a perspective view showing an embodiment that an ordinary stock vice is supported by the adapter table of the present invention.

FIG. 15 shows an embodiment that the adapter table 10 further supports a stock vice 88. The stock vice 88 is fixed by a bolt 89 being screwed into a T-shaped nut (not shown) which is engaged with the groove 30 of the table 10. A work-piece 90 is further fixed to the stork vice and supported by the same. A combination of the adapter table 10 and the holder 9 (FIG. 1 and the like) can be changed and used depending on a work-piece or a purpose of machining.

Advantageous Effect of the Invention

Because of the above-described constitution, the present invention exhibits the following effects.

(1) As the adapter table of the present invention comprising a contact detection circuit is used, the number of exchanging a tool and a measurement tool such as a pin gauge can be reduced and the time required for preparing a machine tool can be shortened.

(2) As well as the probe of the present invention, a pin gauge, a tool and a shank portion of the tool can be utilized as an electrode for contact detection. Unlike a conventional probe or gauge functional element, the probe according to be present invention can be immediately exchanged regardless of a shank diameter. Further, the probe of the present invention is not restricted by a size of the machine. A range of application can be extended.

(3) The moment when the probe or tool serving as a contact detection electrode contacts a work-piece or a stock vice can be reliably recognized by a direct display LED and an extended display LED. Thus, attached matter or variation of center can be checked.

(4) A voltage can be safely and reliably applied depending on a state at a time of detection, a tool or a material to be worked.

(5) Extremely fine powder of work-piece attaches to a tool or a probe. Such attached matter becomes an obstacle especially when the probe is inserted into a small hole. The attached matter can be removed by discharge by extending an energizing time at a time of contact detection or increasing an energizing current. Alternatively, the attached matter can be melted or burn-out by using the clip electrode 12 shown in FIG. 4 while being brushed.

(6) Conventionally, a distal end of tool rotating at high speed cannot be seen and thus the distal end strongly contacts the work-piece and damaged. The moment of contact can be reliably recognized by the direct display LED, the delayed display LED and a sound of buzzer. Thus, such damage can be prevented by controlling a movement of the tool or the table.

(7) A state of contact of working tool can be similarly monitored. A height of Z axis, parallel, and a depth of engraving can be measured. Further, an abnormal situation can be overcome.

What is claimed is:

1. A sensing apparatus in a machine tool having a spindle above a movable table, the apparatus comprising:
   a) an electrically conductive holder for holding an electrically conductive workpiece, the holder being electrically insulated from and mounted on the movable table;
   b) an electrically conductive assembly, including a chuck mounted on the spindle, a probe mounted on the chuck, and an arm mounted on the spindle and extending away from the probe;
   c) a magnetic electrode magnetically attracted to, and mounted on, the electrically conductive assembly; and
   d) means electrically connected to the magnetic electrode, and operative for detecting electrical contact between the probe and one of the holder and the workpiece.

2. The apparatus of claim 1, wherein the holder is an adapter table, and wherein the movable table is an X-Y table movable along two mutually orthogonal directions.

3. The apparatus of claim 1, wherein the probe includes a hollow sleeve having opposite end portions spaced apart along a longitudinal axis, a stop at one of the end portions of the sleeve, a slider mounted within the sleeve for sliding axial movement, a spring between the stop and the slider for urging the slider away from the stop, and a longitudinal gauge having one end bearing against the slider and an opposite end extending through the other of the end portions of the sleeve and into electrical contact with said one of the holder and the workpiece.

4. The apparatus of claim 3, wherein the gauge has a collar for preventing axial movement of the collar past the other end portion of the sleeve.

5. The apparatus of claim 3, wherein the slider has inclined bearing surfaces along which said one end of the gauge is movable to permit limited freedom of tilting movement of the gauge.

6. The apparatus of claim 1, wherein the probe includes a hollow sleeve having an upper cylindrical portion formed with a slit extending along a longitudinal axis, a lower cylindrical portion, and a conical portion between the upper and lower portions; a clamping ring for clamping the upper portion of the sleeve; a guide mounted within and fixed to the conical portion; a shaft having a ball-shaped end and being mounted for sliding axial movement along the lower portion; and a spring located between the guide and the shaft for urging the shaft away from the guide.

7. The apparatus of claim 1, wherein the magnetic electrode includes a casing and a pair of magnetic contacts supported by the casing, and a plurality of indicators on the casing for indicating operation of the magnetic electrode.

8. The apparatus of claim 1, wherein the detecting means includes an operating panel having a plurality of indicators for indicating operation of the detecting means.

9. A sensing apparatus in a machine tool having a spindle above a movable table, the apparatus comprising:
   a) an electrically conductive holder for holding an electrically conductive workpiece, the holder being electrically insulated from and mounted on the movable table;
   b) an electrically conductive assembly, including a chuck mounted on the spindle, a probe mounted on the chuck, and an arm mounted on the spindle and extending away from the probe;
   c) a clip electrode clipped on the electrically conductive assembly; and
   d) means electrically connected to the clip electrode, and operative for detecting electrical contact between the probe and one of the holder and the workpiece.

10. The apparatus of claim 9, wherein the clip electrode includes a pair of clip members pivotably connected for pivoting movement relative to each other, a plurality of electrically conductive bristles on each of the clip members, and a spring for urging the clip members toward each other to a closed position in which the bristles make electromechanical contact with the electrically conductive assembly.

11. The apparatus of claim 9, wherein the holder is an adapter table, and wherein the movable table is an X-Y table movable along two mutually orthogonal directions.

12. The apparatus of claim 9, wherein the detecting means includes an operating panel having a plurality of indicators for indicating operation of the detecting means.

* * * * *